(12) United States Patent
Coushaine

(10) Patent No.: US 7,092,612 B1
(45) Date of Patent: Aug. 15, 2006

(54) LED BULB

(75) Inventor: Charles M. Coushaine, Rindge, NH (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/109,917

(22) Filed: Apr. 20, 2005

Related U.S. Application Data

(60) Provisional application No. 60/651,820, filed on Feb. 10, 2005.

(51) Int. Cl.
*G02B 6/00* (2006.01)
(52) U.S. Cl. ........................ 385/147; 362/555
(58) Field of Classification Search .................... None
See application file for complete search history.

(56) References Cited

U.S. PATENT DOCUMENTS

2003/0147254 A1* 8/2003 Yoneda et al. .............. 362/551

* cited by examiner

*Primary Examiner*—Sung Pak
(74) *Attorney, Agent, or Firm*—William E. Meyer

(57) ABSTRACT

An LED light source has a housing with a hollow projecting core. The core is arrayed about a longitudinal axis. A printed circuit board closes an open end of the housing at a core end and has LEDs operatively fixed about the center thereof. A light guide with a wall thickness T is positioned in the core and has a first end in operative relationship with the plurality of LEDs and a second end projecting beyond the hollow core. A first reflector is attached to the second end of the light guide. The housing is thermally conductive to form an extended and integral heat sink and has an extended body-part that preferably is provided with heat-radiating fins. A preferred material for the housing is thermally conductive plastic. The printed circuit board has a thermally conducive base that is in direct contact with the housing via an upstanding V-shaped rim.

4 Claims, 1 Drawing Sheet

LED BULB

CROSS-REFERENCE TO RELATED APPLICATIONS

This application claims priority from Provisional Patent Application No. 60/651,820, filed, Feb. 10, 2005.

TECHNICAL FIELD

This invention relates to light sources and more particularly to light sources employing light emitting diodes (LED or LEDs) and more particularly to light sources useful in the automotive field such as for headlights, taillights, stoplights, fog lights, turn signals, etc. Still more particularly, it relates to such light sources packaged to achieve industry accepted interchangeability at a lesser cost due to a reduction in the number of parts necessary.

BACKGROUND ART

In the past, most automotive light sources have involved the use of incandescent bulbs. While working well and being inexpensive, these bulbs have a relatively short life and, of course, the thin filament employed was always subject to breakage due to vibration.

Recently some of the uses, particularly the stoplight, have been replaced by LEDs. These solid-state light sources have incredible life times, in the area of 100,000 hours, and are not as subject to vibration failures. However, these LED sources have been hard-wired into their appropriate location, which increases the cost of installation. It would therefore be an advance in the art if an LED light source could be provided that had the ease of installation of the incandescent light sources. It would be a still further advance in the art if an LED light source could be provided that achieved an industry accepted interchangeable standard to replace the aforementioned incandescent bulb.

Such light sources have been developed and occasionally they have employed LEDs in combination with optical fibers or other light guides to concentrate the light of multiple LEDs or to spread the light in a desired fashion. One such light source is described in co-pending patent application Ser. No. 10/899,546, filed Dec. 20, 2004, and assigned to the assignee of the present invention. The latter light source uses a plurality of light guides, in a one-to-one relationship with a like plurality of LEDs. While the arrangement works well, it is expensive and requires a large number of parts, all of which require rather precise alignment. Recently, as disclosed in co-pending patent application Ser. No. 11/058,304, filed Feb. 15, 2005 and assigned to the assignee of the present invention, a light source has been developed using LEDs together with a simplified form of light guide. It would be an advance in the art if the number of parts could be reduced even further without affecting the quality of the light source. Such parts reduction is critical to maintain competitive costs.

DISCLOSURE OF INVENTION

It is, therefore, an object of the invention to obviate the disadvantages of the prior art.

It is another object of the invention to enhance LED light sources.

It is yet another object of the invention to reduce the cost of LED light sources.

These objects are accomplished, in one aspect of the invention, by an LED light source having a housing; a hollow core projecting from the housing, the hollow core being arrayed about a longitudinal axis; a printed circuit board closing the housing at one end of the hollow core and having a plurality of LEDs operatively fixed thereto about the center thereof; a light guide with a body having a given wall thickness positioned in the hollow core and having a first end in operative relationship with the plurality of LEDs and a second end projecting beyond the hollow core; and a first reflector attached to the second end of the light guide: and wherein the improvement comprises the housing being thermally conductive to form an extended and integral heat sink and the printed circuit board having a thermally conductive base that is in direct contact with the housing and provides the closure for the housing.

The number of parts is reduced and thus the cost of the light source is greatly enhanced.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
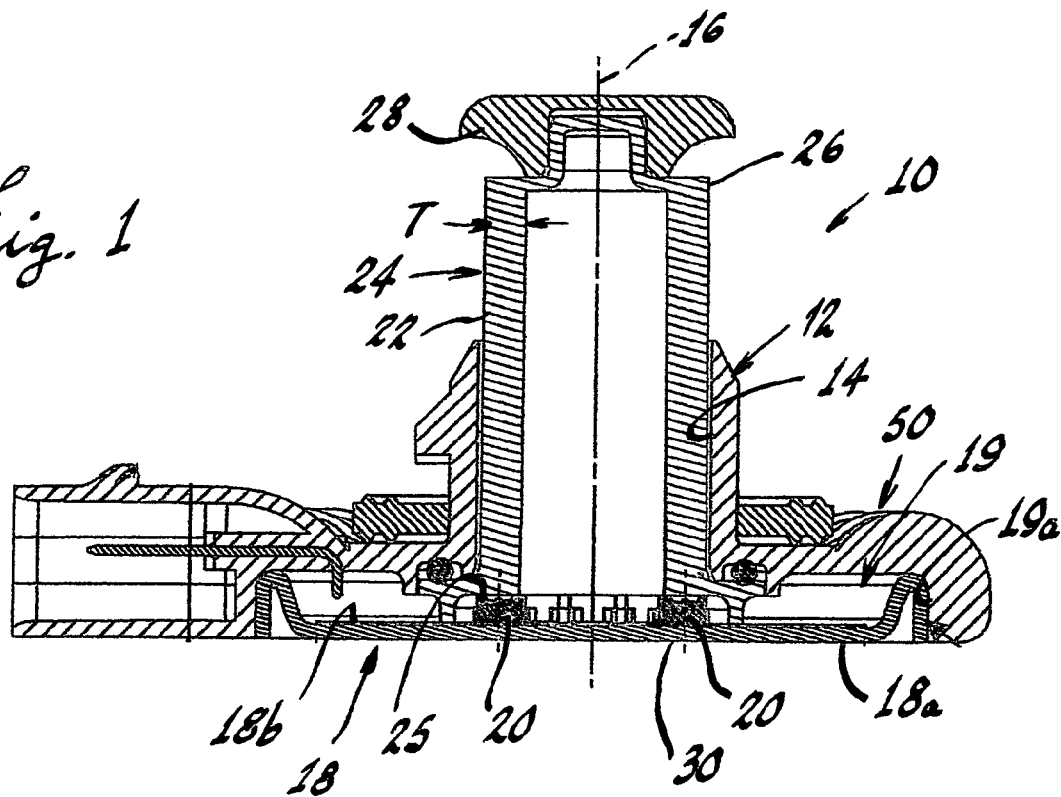
FIG. 1 is a perspective view of a light source according to an embodiment of the invention.
Figure 2:
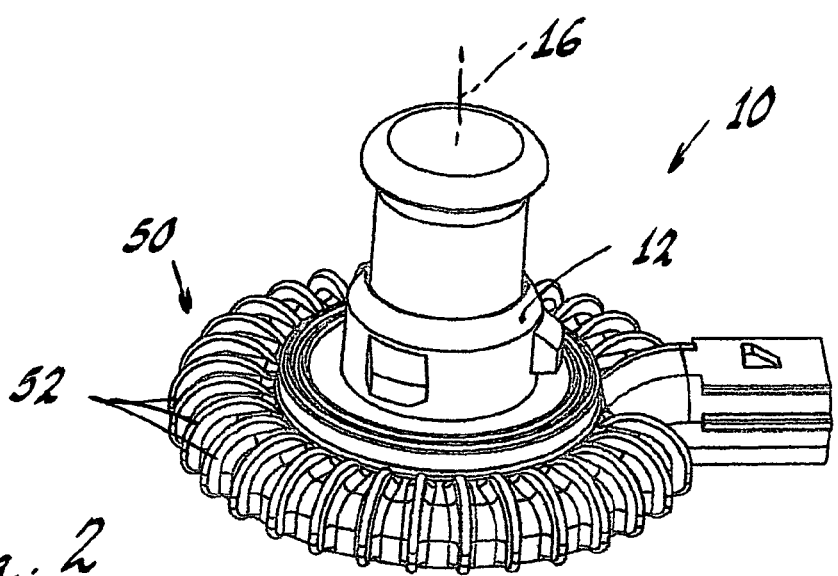
FIG. 2 is a sectional, elevational view thereof.

Referring now to the drawings with greater particularity, there is shown in FIG. 1 an LED light source 10 having a housing 12 with a hollow core 14 projecting therefrom. The hollow core 14 is arrayed about a longitudinal axis 16. A circuit carrier 18, which can be a bent piece of aluminum 18a having a flexible printed circuit board 18b attached thereto, closes the open end 19 of the housing 12 at one end of the hollow core 14 and has a plurality of LEDs 20 operatively fixed thereto about the center thereof. A light guide 22 with a body 24 having a given wall thickness T is positioned in the hollow core 14 and has a first end 25 in operative relationship with the plurality of LEDs and a second end 26 projecting beyond the hollow core 14. A first reflector 28 is attached to the second end 26 of the light guide 22.

The housing 12 is thermally conductive to form an extended and integral heat sink and has an extended body-part 50 that preferably is provided with heat-radiating fins 52. A preferred material for the housing 12 is a thermally conductive plastic such as Cool Polymers E3603 thermally conductive polyamide. The printed circuit board 18 has a thermally conducive base 30 that is in direct contact with the housing 12 via an upstanding V-shaped rim 32.

The V-shaped rim is tensioned to provide a force-fit against the internal wall 19a of the open end 19 of the housing 12. Preferably, the printed circuit board is formed of flex-on aluminum.

Insertion of the printed circuit board 18 brings the circuitry on the board into press-on contact with the electrical lead-ins 54 (only one of which is shown) that are positioned in a connector 56, for supplying power to the LEDs from an external supply, thus eliminating the need for welding.

Utilizing the printed circuit board 18 as the closure mechanism for the housing 12 further eliminates a separate closing member and an O-ring, in addition to the operations necessary for attaching an extra closing member, all ingredients of the prior art construction.

Employing the housing itself as an extended heat sink also reduces the number of parts, as well as the weight of the light source.

While there have been shown and described what are present considered to be the preferred embodiments of the invention, it will be apparent to those skilled in the art that various changes and modifications can be made herein without departing from the scope of the invention as defined by the appended claims.

What is claimed is:

1. In an LED light source having
a housing; a hollow core projecting from said housing, said hollow core being arrayed about a longitudinal axis; a printed circuit board closing said housing at one end of said hollow core and having a plurality of LEDs operatively fixed thereto about the center thereof; a light guide with a body having a given wall thickness positioned in said hollow core and having a first end in operative relationship with said plurality of LEDs and a second end projecting beyond said hollow core; and a first reflector attached to said second end of said light guide:

the improvement comprising:

said housing being thermally conductive to form an extended and integral heat sink, having externally exposed heat dissipating features, and an internal wall defining a cavity with an open end and said printed circuit board having a periphery in contact with said internal wall for thermal conduction from said circuit board to said heat sink, and closing said defined cavity; said circuit board further exposed on an exterior side spanning the open end of said heat sink.

2. The LED light source of claim 1 wherein said printed circuit board has an upstanding rim.

3. The LED light source of claim 2 wherein said rim takes the form of an inverted V.

4. The LED light source of claim 3 wherein said inverted V is tensioned to provide a force-fit with said housing.

* * * * *